United States Patent
Wu et al.

(10) Patent No.: US 12,441,881 B2
(45) Date of Patent: Oct. 14, 2025

(54) THERMAL INTERFACE MATERIALS

(71) Applicant: Henkel AG & Co. KGaA, Duesseldorf (DE)

(72) Inventors: Chunyong Wu, Plymouth, MN (US); John Timmerman, Minneapolis, MN (US); Reid Chesterfield, Eden Prairie, MN (US); Radesh Jewram, Lakeville, MN (US)

(73) Assignee: Henkel AG & Co. KGaA, Duesseldorf (DE)

(*) Notice: Subject to any disclaimer, the term of this patent is extended or adjusted under 35 U.S.C. 154(b) by 678 days.

(21) Appl. No.: 17/446,211

(22) Filed: Aug. 27, 2021

(65) Prior Publication Data
US 2021/0388203 A1 Dec. 16, 2021

Related U.S. Application Data

(63) Continuation of application No. PCT/US2020/019888, filed on Feb. 26, 2020.

(60) Provisional application No. 62/811,074, filed on Feb. 27, 2019.

(51) Int. Cl.

| | | |
|---|---|---|
| *C08L 71/00* | (2006.01) | |
| *C08G 65/336* | (2006.01) | |
| *C08K 3/22* | (2006.01) | |
| *C08K 3/36* | (2006.01) | |
| *C08K 5/00* | (2006.01) | |
| *C08K 5/57* | (2006.01) | |
| *H01M 10/659* | (2014.01) | |

(52) U.S. Cl.
CPC ............ *C08L 71/00* (2013.01); *C08G 65/336* (2013.01); *C08K 3/22* (2013.01); *C08K 3/36* (2013.01); *C08K 5/0016* (2013.01); *C08K 5/005* (2013.01); *C08K 5/57* (2013.01); *H01M 10/659* (2015.04); *C08K 2003/2227* (2013.01); *C08K 2201/001* (2013.01); *C08K 2201/005* (2013.01)

(58) Field of Classification Search
CPC ....... C08L 71/00; C08L 71/02; C08G 65/336; C08G 65/26; C08G 65/266; C08G 65/2687; C08K 3/22; C08K 3/36; C08K 5/0016; C08K 5/005; C08K 5/57; C08K 2003/2227; C08K 2201/001; C08K 2201/005; C08K 3/34; C08K 2201/014; C08K 3/013; H01M 10/659; H01M 10/625; H01M 10/653; H01M 10/613; H01M 2220/20; H01M 10/6551; Y02E 60/10; C08J 3/02; C08J 3/24
See application file for complete search history.

(56) References Cited

U.S. PATENT DOCUMENTS

| | | | |
|---|---|---|---|
| 5,648,427 A * | 7/1997 | Fujita | C08G 65/336 |
| | | | 525/104 |
| 2007/0088110 A1 | 4/2007 | Kohl et al. | |
| 2011/0311767 A1 | 12/2011 | Elahee et al. | |
| 2013/0178560 A1 | 7/2013 | Hersee et al. | |
| 2018/0076493 A1 | 3/2018 | Park et al. | |
| 2018/0251590 A1 | 9/2018 | Kunitomo et al. | |

FOREIGN PATENT DOCUMENTS

| | | | |
|---|---|---|---|
| JP | 2002309077 A | * 10/2002 | |
| WO | WO-2013051721 A1 | * 4/2013 | ........... C08G 65/336 |

OTHER PUBLICATIONS

English translation of WO-2013051721-A1 (Year: 2013).*
English translation of JP-2002309077-A (Year: 2002).*
Univar Solutions, Dioctyl Adipate Safety Data Sheet (Year: 1).*

* cited by examiner

*Primary Examiner* — Mark Eashoo
*Assistant Examiner* — Cullen L G Davidson
(74) *Attorney, Agent, or Firm* — Steven C. Bauman

(57) ABSTRACT

A thermally conductive curable composition includes a first part and a second part, wherein the first part comprises a catalyst, a ceramic filler mixture, a low volatile organic liquid, and water, and the second part comprises a silyl modified reactive polymer, a low volatile organic liquid, and the ceramic filler mixture, and the low volatile organic liquid is present in the composition in an amount greater than about 50 wt. % based on the total weight of the silyl modified reactive polymer.

15 Claims, No Drawings

THERMAL INTERFACE MATERIALS

BACKGROUND OF THE INVENTION

Thermal interface materials are widely utilized in the electronics industry for coupling heat sources to heat-sinking structures to assist in the dissipation of heat from the heat source. Ordinarily, these thermal interface materials are utilized in connection with heat-generating electronic components. These thermal interface materials generally operate by expelling excess thermal energy generated by the heat sources to the heat-sinking structures.

Similar to electronics, electric vehicles are typically equipped with a battery containing multiple battery cells that store electrical power for powering the electric vehicle. The battery cells may be charged prior to use and recharged during a drive by regeneration braking or an internal combustion engine. The battery cells may heat up during use, requiring the use of a heat-sinking structure to prevent the battery cells from overheating. The heat develops as a product of the chemical reactions taking place inside the batteries during charging, and ideally, the temperature of the batteries is maintained in the range of 25–30° C. However, when performing normal or quick charging, the temperature of the batteries far exceeds this desirable range. Further, the ideal temperature of 25-30° C. is not possible to maintain when the outside temperature itself surpasses this range of temperatures. This is the case even when a cooling fan is used to expel the air from within the battery tray during recharging. Overheating is therefore a problem when recharging the batteries for an electric vehicle.

If the batteries of electric vehicles are overheated, the batteries may deform and a short may develop internally. This can result in vaporized battery gas combusting or exploding, thereby potentially causing the vehicle to catch fire. Accordingly, thermal management of the batteries of electric vehicles is necessary not only to achieve optimal efficiency and longevity but also to meet safety standards of electric vehicles.

Ordinarily, to maximize the heat transfer from a heat source to a heat-sinking structure, thermal interface materials are used provide an intimate contact between the heat source and the heat-sinking structure. Generally, thermal interface materials should be capable of filling various gaps corresponding to the difference in height among elements. Thus, thermal interface materials having not only high thermal conductivity, but also high flexibility are desired. The thermal interface materials typically used in electronic devices are small scale, as many electronic devices are handheld. Those thermal interface materials used in small electronic devices to date have not been capable of being used on larger heat sources. Larger heat sources, such as the electric vehicle batteries discussed above, require different thermal interface materials having different properties. For example, the flow properties and viscosity of thermal interface materials must be modified when used with a larger heat source such as an electric vehicle battery. Further, the useful dispense rate of the thermal interface material used on a large heat source will be different than that of a thermal interface material used on a small heat source.

Accordingly, there remains a need for high thermal conductivity thermal interface materials with that are also silicone-free and have customizable dispense rates for functioning at a larger scale, for example in electric vehicle batteries.

BRIEF SUMMARY OF THE INVENTION

Disclosed herein is a thermally conductive curable composition comprising a first part and a second part. The first part comprises a catalyst, a ceramic filler mixture, a low volatile organic liquid, and water, and wherein the second part comprises a silyl modified reactive polymer, a low volatile organic liquid, and a ceramic filler mixture. The low volatile organic liquid is present in the composition in an amount greater than about 50 wt. % based on the total weight of the silyl modified reactive polymer.

Another embodiment discloses a thermally conductive curable composition comprising a first part and a second part, wherein the first part comprises a low volatile organic liquid, water, rheology additives, pigment, a ceramic filler mixture, fumed silica and an organotin catalyst, and the second part comprises a low volatile organic liquid, rheology additives, multifunctional polymers, the ceramic filler mixture, an antioxidant, and a water scavenger. The ceramic filler mixture comprises 4 wt. % of a ceramic filler with a D50 of 0.3 µm, 36 wt. % of a ceramic filler with a D50 of 2.4 µm and 60 wt. % of a ceramic filler with a D50 of 40 µm based on the total weight of the filler mixture.

Another embodiment discloses a method of making a thermally conductive curable composition comprising: mixing a first part comprising a catalyst, a ceramic filler mixture and water with a second part comprising a reactive polymer, the ceramic filler mixture and a water scavenger, wherein the mixture is a solid after cure.

Another embodiment discloses battery comprising: a heat source, a cooling mechanism and the thermally conductive curable compositions disclosed herein disposed therebetween.

DETAILED DESCRIPTION OF THE INVENTION

Disclosed herein is a two part thermally conductive curable composition that can be used as a thermal interface material after curing. The thermally conductive curable compositions disclosed herein can be useful as large, i.e. 1500 mm² or greater, surface area thermal interface materials, for example in electric and hybrid vehicle batteries. These thermally conductive curable compositions are curable at room temperature independent of environmental moisture. They also have a fast dispensing rate, are stable after dispensing, and low compression stress during application.

The thermally conductive curable compositions disclosed herein are intended to be formulated with a lower viscosity for use by commercial auto dispensers, and reduced compression stress induced during apparatus assembly, especially in automobile manufacturing, which requires delivery of a substantial amount of the materials and assembly of the automobile apparatus in a timely manner.

The thermally conductive curable compositions disclosed herein comprise two parts, a first part and a second part. The terms first part and second part are used throughout to indicate two distinct parts, and do not limit the parts in terms of order of application or otherwise.

The first part contains a catalyst, and the second part contains a reactive polymer. Regardless of the other components of the first and second parts, the catalyst and reactive polymer are included in separate parts. Preferably, the first part comprises a catalyst, a ceramic filler mixture, low volatile organic liquid, and water, and the second part comprises a silyl modified reactive polymer, low volatile organic liquid, and a ceramic filler mixture. Once the first part and the second part are mixed, the mixture will cure at room temperature to a solid through silyl hydrolyzation and condensation.

Reactive Polymer

The reactive polymer can be any reactive polymer capable of participating in a silyl hydrolyzation reaction. For example, the reactive polymer can be selected from a wide range of polymers as polymer systems that possess reactive silyl groups, for example a silyl-modified reactive polymer. The silyl-modified reactive polymers can have a non-silicone backbone to limit the release of silicone when used in an electronic device. Preferably the silyl-modified reactive polymer has a non-silicone backbone, more preferably this silyl-modified reactive polymer has a polyether backbone.

The silyl-modified reactive polymer can be obtained by reacting a polyether with at least one ethylenically unsaturated silane in the presence of a radical starter, the ethylenically unsaturated silane carrying at least one hydrolyzable group on the silicon atom. For example, the silyl modified reactive polymer can be dimethoxysilane modified polymer, trimethoxysilane modified polymer, or triethoxysilane modified polymer. For example, the silyl modified reactive polymer can be the silyl modified reactive polymer is a silane modified polyether.

The ethylenically unsaturated silane is particularly preferably selected from the group made up of vinyltrimethoxysilane, vinyltriethoxysilane, vinyldimethoxymethylsilane, vinyldiethoxymethylsilane, trans-β-methylacrylic acid trimethoxysilylmethyl ester, and trans-β-methylacrylic acid trimethoxysilylpropyl ester.

The silyl-modified reactive preferably comprise(s) silyl groups having at least one hydrolyzable group on the silicon atom in a statistical distribution.

For example, the silyl-modified reactive polymer can be a silane-modified polymer of general formula (Ia):

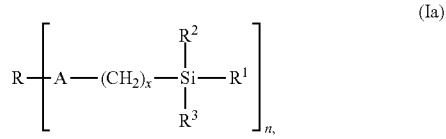

in which R is a mono- to tetravalent polymer radical, $R^1$, $R^2$, $R^3$ independently is an alkyl or alkoxy group having 1 to 8 C atoms and A represents a carboxy, carbamate, amide, carbonate, ureido, urethane or sulfonate group or an oxygen atom, x=1 to 8 and n=1 to 4.

The silyl-modified reactive polymer can also be obtained by reacting a polyether with hydroxy group and alkoxylsilane with isocyanate group. For example, the silyl modified reactive polymer can be dimethoxysilane modified polyurethane polymer, trimethoxysilane modified polyurethane polymer, or triethoxysilane modified polyurethane polymer.

Further, the silyl-modified reactive polymer can be a α-ethoxysilane modified polymer of the average general formula (Ib):

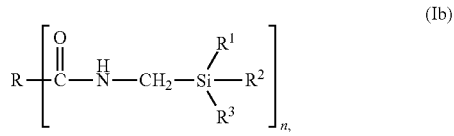

in which R is a mono- to tetravalent polymer residue, at most one third of the polymer of formula (Ib) contained residues $R^1$, $R^2$ and W are independently alkyl radicals having 1 to 4 carbon atoms, at least one-quarter of the polymer of the formula (Ib) residues contained $R^1$, $R^2$ and $R^3$ are independently ethoxy residues that any remaining radicals $R^1$, $R^2$ and $R^3$ independently of one another are methoxy radicals, and wherein n=1 to 4.

Silyl-modified reactive polymers are available, for example, as dimethoxysilane modified MS polymer from Kaneka, trimethoxysilane modified ST polymer from Evonik, triethoxysilane modified Tegopac polymer from Evonik, silane modified Desmoseal polymer from Covestro, or silane modified SMP polymer from Henkel. Preferably, the silyl-modified reactive polymer is dimethoxysilane terminated MS polymer.

The silyl-modified reactive polymer is present in the part of the composition that does not contain the catalyst.

The silyl-modified reactive polymer can be present in the composition in an amount from about 20 wt. % to about 90 wt. %, for example about 30 wt. % to about 70 wt. %, based on the total weight of the part of the composition that comprises the silyl-modified reactive polymer.

Ceramic Filler Mixture

The ceramic filler mixture preferably comprises alumina and is preferably added to each of the first part and the second part in equal amounts to enhance thermal conductivity. The ceramic filler mixture is preferably present in each of the first part and the second part in an amount from about 80 wt. % to about 95 wt. %, for example about 90-92 wt. %, based on the total weight of each of the first part and the second part.

In a particularly useful embodiment, the ceramic filler mixture comprises 2.4 μm ceramic fillers, 40 μm ceramic fillers, and 0.3 μm ceramic fillers. Preferably, the 2.4 μm ceramic fillers are present in the composition in an amount of about 4 wt. % based on the total weight of the ceramic filler mixture, the 40 μm ceramic fillers are present in an amount of about 36 wt. % based on the total weight of the ceramic filler mixture, and 0.3 μm ceramic fillers present in an amount of about 60 wt. % based on the total weight of the ceramic filler mixture.

Catalyst

A catalyst is included in the first part of the composition. Specifically, the catalyst can be an organic metal catalyst for silyl hydrolyzation and condensation, for example an organotin catalyst. The catalyst should not be included in the second part of the composition, which includes the polymer. Preferably, the catalyst is an organotin catalyst or organobismuth catalyst.

Low Volatile Organic Liquid

A low volatile organic liquid is included in the composition to lower the viscosity of the first and second part under high shear rate. The low volatile organic liquid can be included in the first part and/or the second part.

The low volatile organic liquid has a viscosity of about 10-1000 cPs, for example about 10-100 cPs.

Low volatile organic liquid is present in both the first part and second part in an amount greater than about 50 wt. % based on the total weight of the polymer. If too much low volatile organic liquid is included in the composition the composition will not be able to cure to a solid at room temperature, and instead will be a high viscosity liquid. If too little low volatile organic liquid is included in the composition, the composition will cure and become too hard, and the viscosity of the second part will be too high.

Preferably the low volatile organic liquid is miscible with the resin and compatible with the filler matrix, for example the low volatile organic liquid can be a plasticizer. Even more preferably, the low volatile organic liquid is selected from phthalates, cyclohexane dicarboxylic acid diisononyl ester, trimellitates, terephthalates, adipates, sebacates, maleates, alkyl citrates, epoxidized vegetable oils, alkyl sulphonic acid phenyl esters, sulfonamides, organophosphates, glycols and polyethers, and polymeric plasticizers. Even more preferably, the low volatile organic liquid is selected from ethylhexyl adipate, isononyl adipate and combinations thereof, more preferably isononyl adipate.

Water

Water can also be present in the composition. While water can be present from the inclusion of ceramic fillers and other components of the formulation, the first part of the composition preferably includes added with water to promote hydrolyzation and completion of curing within 72 hours, preferably within 24 hours, even without the help of external moisture. In a preferred embodiment, water is present in the first part in an amount from 500 ppm to 5000 ppm based on the total weight of the first part.

Water Scavenger

The second part of the composition preferably includes a water scavenger for extended pot life. The water scavenger can be, for example, alkyltrimethoxysilane, oxazolidines, zeolite powder, p-toluenesulfonyl isocyanate, and ethyl orthoformate. The water scavenger is preferably vinyltrimethoxysilane. If too much of the water scavenger is included in the composition the curing will be slowed. In an amount of greater than about 1 PHR and less than about 5 PHR, for example about 2 PHR.

Optional Components

In another embodiment, the composition can optionally include rheology additives. These rheology additives can be included in the first part, in the second part, or in both the first and second part. A rheology additive can further be included in the composition to prevent against sagging of the polymer. The rheology additive can be included in an amount of less than about 1 wt. %, for example less than about 0.5 wt. % based on the total weight of the composition.

The rheology additive should be added to the composition in an amount of about 0.01-1 wt. %, for example about 0.1-0.2 wt. % based on the total weight of the reactive polymer in the composition. The rheology additive can be, for example, fumed silica, organoclay, and branched polymer, thixotropic agent and dispersion agent for ceramic filler.

Composition

The composition can be useful as a thermal interface material, for example a thermal interface material for use in electric vehicles. The composition is made by mixing the first part and the second part, preferably in a 1:1 ratio. The composition cures to a solid at room temperature through silane hydrolyzation and condensation. After mixing the first part and the second part the composition will cure at room temperature and at any external humidity.

The first and second parts have similar viscosities before mixing. For example, the first part has a viscosity of greater than about 300 Pas, for example about 200-1500 Pas at 1/s and less than about 200 Pas at 3000/s, for example about 300-500 Pas at 1/s and less than about 50 Pas at 3000/s. The second part has a viscosity of about 200-1500 Pas at 1/s and less than about 200 Pas at 3000/s, for example about 300-500 Pas at 1/s, and less than about 50 Pas at 3000/s.

After cure the composition has a thermal conductivity of about 2.0 to about 5.0 W/mK, for example about 2.5-3.5 W/mK.

In an alternative embodiment, disclosed herein is a battery comprising a heat source, a cooling mechanism and the compositions disclosed herein disposed therebetween.

A "polyether" is understood for purposes of the present invention as a polymer whose repeating units are held together by C—O—C ether functionalities. Polymers having lateral ether groups, such as cellulose ethers, starch ethers, and vinyl ether polymers, as well as polyacetals, are therefore not covered by this definition.

An "ethylenically unsaturated silane" is understood as a non-polymeric silicon compound in which at least one silicon atom is connected by chemical bonding to at least one organic residue that comprises a carbon-carbon double bond (C=C).

A "hydrolyzable group" is understood in the context of the present invention as a substituent that can be converted into a hydroxy group (OH) by reacting with water. Hydrolyzable groups are to be understood in particular as alkoxy groups (also referred to as alkyloxy groups) and acyloxy groups.

EXAMPLES

Example A is a 2-component thermally conductive material, including a first part and a second part. The first part includes less than 10 wt. % low volatile organic liquid with a viscosity of less than 100 cps, less than 0.5 wt. % rheology additives (fume silica, organoclay, or liquid rheology additive), less than 0.2 wt. % organotin catalyst, less than 0.5 wt. % pigment, more than 90 wt. % alumina powder, and optionally, less than 0.5 wt. % DI water. The second part includes less than 10 wt. % low volatile organic liquid with viscosity below 100 cps, less than 10 wt. % alkoxysilane modified polyether, 0.5 wt. % rheology additives (fume silica, organoclay, or liquid rheology additive), less than 0.5 wt. % antioxidant, less than 0.5 wt. % water scavenger, and more than 90 wt. % alumina powder. Curing of the composition is achieved by mixing the first part and the second part in about a one to one volume ratio, which became solid within about 24 hours. The hardness of a cured 250 mm puck measured by Shore 00 durometer is between about 50 and about 80.

Example B

The first part was prepared by adding 98 of plasticizer, 3.5 g of rheology additive, 63 g of alumina filler with average size of 0.3 micron, 357 g of alumina filler with average size of 3 micron, 630 g of alumina filler with average size of 40 micron, 1 g of dibutyltin catalyst, and 1 g of deionized water into a 0.6 gallon size of mixing bucket, and mixing twice at 800 rpm for 2 minutes with Flacktec DAC-5000 high speed mixer. The second part was prepared by adding 46 g of plasticizer, 50 g of methoxysilane terminated polyether, 4 g of rheology additive, 2 g of hindered phenolic antioxidant, 21 g of alumina filler with average size of 0.3 micron, 399 g of alumina filler with average size of 3 micron, 630 g of alumina filler with average size of 40 micron, and 2 g of water scavenger into a 0.6 gallon size of mixing bucket, and mixing twice at 800 rpm for 2 minutes with Flacktec DAC-5000 high speed mixer.

Examples B and C have a different resin composition in the second part, and Example D has a higher filler loading, as compared to Example B. Each of Examples A-D is otherwise prepared with the same method as the Example B described above. Comparison of the composition of the samples are shown in Table 1, below.

TABLE 1

|  | Example A PHR | Example B PHR | Example C PHR | Example D PHR |
|---|---|---|---|---|
| Component in Part A | | | | |
| Plasticizer | 98.0 | 98.0 | 98.0 | 98.0 |
| Rheology additive | 3.5 | 3.5 | 3.5 | 3.5 |
| Pigment | 2.0 | 2.0 | 2.0 | 2.0 |
| 2.4 micron size alumina powder | 357.0 | 357.0 | 357.0 | 560.0 |
| 40 micron alumina powder | 630.0 | 630.0 | 630.0 | 960.0 |
| 0.3 micron alumina powder | 63.0 | 63.0 | 63.0 | 80.0 |
| Catalyst | 1.0 | 1.0 | 1.0 | 1.0 |
| DI water | 1.0 | 1.0 | 1.0 | 1.0 |
| Component in Part B | | | | |
| Plasticizer | 46.0 | 76.0 | 21.0 | 46.0 |
| Rheology additive | 4.0 | 4.0 | 4.0 | 4.0 |
| Silane terminated polyether | 50.0 | 20.0 | 75.0 | 50.0 |
| 2.4 micron size alumina powder | 399.0 | 399.0 | 399.0 | 608.0 |
| 40 micron alumina powder | 630.0 | 630.0 | 630.0 | 960.0 |
| 0.3 micron alumina powder | 21.0 | 21.0 | 21.0 | 32.0 |
| Antioxidant | 2.0 | 2.0 | 2.0 | 2.0 |
| Water scavenger | 2.0 | 2.0 | 2.0 | 2.0 |

The viscosity of thermal conductive compositions described in Examples A, B, C, and D, was measured by parallel plate rheometer at 1/s shear rate, and by capillary rheometer at 3000/s shear rate. Hardness of the compositions was measured by using one to one mixture of the first part and the second part and curing for about 72 hours at room temperature. Comparison of properties of the compositions are shown in Table 2, below.

TABLE 2

|  | Example A | Example B | Example C | Example D |
|---|---|---|---|---|
| Filler loading (phr) | 1150 | 1150 | 1150 | 1600 |
| Viscosity (Pa-s) @ 1 1/s of part B | 600 | 300 | 1856 | not mixable for test |
| Viscosity (Pa-s) @ 3000 1/s of part B | 24 | 8 | 56 | not mixable for test |
| Curing hardness (Shore OO) | 65 | no cured for test | 83 | not mixable for test |

What is claimed is:

1. A thermally conductive curable composition comprising a first part and a second part,
    wherein the first part comprises a catalyst, a ceramic filler mixture, a low volatile organic liquid, and water,
    wherein the second part comprises a silane modified polyether, a low volatile organic liquid, and a ceramic filler mixture,
    wherein the low volatile organic liquid has a viscosity of less than 100 cPs, and is present in the composition in an amount greater than about 50 wt. % based on the total weight of the silane modified polyether, and wherein the silane modified polyether is present in an amount of between 1.7 wt. % and 6.5 wt. % based on the total weight of the second part, and wherein the first part and the second part are present in the curable composition in a ratio of about 1:1.

2. The thermally conductive curable composition of claim 1, wherein the silane modified polyether is dimethoxysilane modified polyether, trimethoxysilane modified polyether, triethoxysilane modified polyether, or a combination thereof.

3. The thermally conductive curable composition of claim 1, wherein the water is present in the first part in an amount from 500 ppm to 5000 ppm based on the total weight of the first part.

4. The thermally conductive curable composition of claim 1, wherein the second part further comprises a water scavenger in an amount of between 1 wt. % and 5 wt. % based on the total weight of the silane modified polyether.

5. The thermally conductive curable composition of claim 1, wherein the first part and/or the second part further comprises a rheology additive.

6. The thermally conductive curable composition of claim 1, wherein the catalyst is an organotin catalyst, an organobismuth catalyst, or a combination thereof.

7. The thermally conductive curable composition of claim 1, wherein the first part and the second part have a viscosity at 1/s above 300 Pas and a viscosity at 3000/s below 50 Pas.

8. The thermally conductive curable composition of claim 1, wherein the ceramic filler mixture is present in each of the first part and the second part in an amount from about 80 wt. % to about 95 wt. % based on the total weight of each of the first part and the second part.

9. The thermally conductive curable composition of claim 1, wherein the ceramic filler mixture comprises a first ceramic filler having a D50 of 2.4 μm, a second ceramic filler having a D50 of 40 μm, and a third ceramic filler having a D50 of 0.3 μm.

10. The thermally conductive curable composition of claim 9, wherein the first ceramic filler is present in the composition in an amount of about 4 wt. % based on the total weight of the ceramic filler mixture, the second ceramic filler is present in an amount of about 36 wt. % based on the total weight of the ceramic filler mixture, and the third ceramic filler is present in an amount of about 60 wt. % based on the total weight of the ceramic filler mixture.

11. A method of making the thermally conductive curable composition of claim 1, the method comprising:
    mixing the first part with the second part,
    wherein the mixture is a solid after cure.

12. The method of claim 11, wherein the mixture is cured at room temperature.

13. The method of claim 12, wherein after cure the composition has a thermal conductivity of about 2.0 to about 5.0 W/mK.

14. The method of claim 12, wherein the first part and the second part are mixed in a ratio of about 1:1.

15. A battery comprising:
    a heat source, a cooling mechanism and the composition of claim 1 disposed therebetween.

* * * * *